United States Patent
Irisawa et al.

(10) Patent No.: US 7,325,144 B2
(45) Date of Patent: Jan. 29, 2008

(54) PORTABLE INFORMATION PROCESSOR HAVING PASSWORD CODE CHECKING FUNCTION

(75) Inventors: Kazuyoshi Irisawa, Tokyo (JP); Tetsuo Shinriki, Tokyo (JP); Naoto Shibata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 797 days.

(21) Appl. No.: 10/333,333

(22) PCT Filed: Jul. 26, 2001

(86) PCT No.: PCT/JP01/06449

§ 371 (c)(1),
(2), (4) Date: Jan. 17, 2003

(87) PCT Pub. No.: WO02/10924

PCT Pub. Date: Feb. 7, 2002

(65) Prior Publication Data

US 2003/0163695 A1    Aug. 28, 2003

(30) Foreign Application Priority Data

Jul. 31, 2000    (JP) .............................. 2000-231002

(51) Int. Cl.
*H04L 9/00*    (2006.01)
*G06F 12/14*    (2006.01)

(52) U.S. Cl. ........................ 713/185; 726/19; 713/170

(58) Field of Classification Search ................ 713/185, 713/170; 726/19

See application file for complete search history.

(56) References Cited

U.S. PATENT DOCUMENTS

| | | | | | |
|---|---|---|---|---|---|
| 4,959,860 | A | * | 9/1990 | Watters et al. ................. | 726/19 |
| 5,058,116 | A | * | 10/1991 | Chao et al. .................. | 714/764 |
| 5,115,508 | A | * | 5/1992 | Hatta ........................ | 340/5.22 |
| 5,282,247 | A | * | 1/1994 | McLean et al. ............. | 711/164 |
| 5,469,564 | A | * | 11/1995 | Junya ......................... | 726/18 |
| 5,491,827 | A | * | 2/1996 | Holtey ....................... | 711/163 |
| 5,537,544 | A | * | 7/1996 | Morisawa et al. ............ | 726/19 |
| 5,572,696 | A | * | 11/1996 | Sonobe ....................... | 711/202 |
| 5,594,793 | A | * | 1/1997 | Bahout ....................... | 713/193 |
| 5,623,637 | A | * | 4/1997 | Jones et al. .................. | 711/164 |
| 5,671,394 | A | * | 9/1997 | Katsuta ...................... | 711/164 |

(Continued)

FOREIGN PATENT DOCUMENTS

| | | |
|---|---|---|
| JP | 06236325 | 8/1994 |
| JP | 08115266 | 5/1996 |

*Primary Examiner*—Nasser Moazzami
*Assistant Examiner*—David Garcia Cervetti
(74) *Attorney, Agent, or Firm*—Ladas & Parry (57) ABSTRACT

Switching between a requiring mode and a non-requiring mode of password code checking is enabled by an IC card with a CPU for accessing an EEPROM. The general data in the EEPROM are stored upon attachment of error check codes. The memory area of EEPROM is partitioned into unit areas of 2-byte length and writing is performed according to unit areas. The MSB of a specific unit area Ux is used as a checking requirement flag with "1" being defined as checking "required" and "0" being defined as checking "not required". In rewriting the checking requirement flag, an erasure process sets all bits in the unit area Ux to "1" and thereafter the desired flag is set in the MSB.

20 Claims, 4 Drawing Sheets

U.S. PATENT DOCUMENTS

| | | | |
|---|---|---|---|
| 5,729,717 A * | 3/1998 | Tamada et al. | 711/164 |
| 5,778,068 A * | 7/1998 | Johnson et al. | 713/189 |
| 5,838,901 A * | 11/1998 | Curd et al. | 726/26 |
| 5,845,066 A * | 12/1998 | Fukuzumi | 726/19 |
| 5,857,021 A * | 1/1999 | Kataoka et al. | 705/54 |
| 5,923,841 A * | 7/1999 | Lee | 726/19 |
| 5,931,948 A * | 8/1999 | Morisawa et al. | 726/19 |
| 5,954,818 A * | 9/1999 | Dalvi et al. | 726/16 |
| 5,983,349 A * | 11/1999 | Kodama et al. | 726/19 |
| 5,991,880 A * | 11/1999 | Curd et al. | 726/28 |
| 6,003,134 A * | 12/1999 | Kuo et al. | 726/20 |
| 6,012,146 A * | 1/2000 | Liebenow | 726/17 |
| 6,035,401 A * | 3/2000 | Dalvi et al. | 714/746 |
| 6,070,255 A * | 5/2000 | Dell et al. | 714/48 |
| 6,073,243 A * | 6/2000 | Dalvi et al. | 726/21 |
| 6,088,802 A * | 7/2000 | Bialick et al. | 726/3 |
| 6,179,205 B1 * | 1/2001 | Sloan | 235/382 |
| 6,196,594 B1 * | 3/2001 | Keller | 283/82 |
| 6,202,014 B1 * | 3/2001 | Brandt et al. | 701/50 |
| 6,230,325 B1 * | 5/2001 | Iinuma et al. | 725/110 |
| 6,240,517 B1 * | 5/2001 | Nishioka | 726/20 |
| 6,308,182 B1 * | 10/2001 | Nishigaya et al. | 707/103 R |
| 6,321,335 B1 * | 11/2001 | Chu | 726/28 |
| 6,460,138 B1 * | 10/2002 | Morris | 713/184 |
| 6,499,092 B1 * | 12/2002 | Harwood et al. | 711/163 |
| 6,742,712 B1 * | 6/2004 | Kawaguchi et al. | 235/492 |
| 6,996,692 B2 * | 2/2006 | Kouno | 711/164 |
| 7,069,447 B1 * | 6/2006 | Corder | 713/189 |

* cited by examiner

PORTABLE INFORMATION PROCESSOR HAVING PASSWORD CODE CHECKING FUNCTION

TECHNICAL FIELD

This invention concerns a portable information processing device having password code checking function, and in particular, concerns a portable information processing device with password code checking function that enables switching between a mode that requires the checking of a password code to use and a mode that does not require such checking.

BACKGROUND ART

With the improvement of the degree of integration of semiconductor integrated circuits, technologies for realizing highly functional, compact information processing devices have been established, and presently, portable information processing devices have become popular in various fields. The use of portable information processing devices, such as IC (Integrated Circuit) cards, cellular phones, PDA's (Personal Digital Assistants) is now so common that each individual user owns such a unit. Since a portable information processing device is thus a device for processing information of a personal level of each user, various kinds of personal information related to privacy are stored in the interior of such devices. Such devices therefore require adequate security measures. Thus in general, a portable information processing device is equipped with a password code checking function and is provided with a security measure that enables use only in the case where, upon checking of a password code that has been registered in the interior in advance with a password code that has been input from the exterior at the time of use, the password codes match each other.

Though a general portable information processing device is equipped with a password code checking function as has been mentioned above, the higher the frequency of use of the device, the more troublesome it becomes to perform the operation of inputting the password code for use each time. Portable information processing devices, which enable switching between a mode that requires checking of a password code for use and a mode that does not require such checking, have thus been proposed. However, conventionally proposed portable information processing devices with a switching function could not ensure adequate security. That is, in order to provide such a switching function, information that indicates whether or not checking is necessary must be stored inside the device. However, if this information becomes rewritten through illegitimate access or becomes rewritten due to some effect even during legitimate use, access may be enabled without checking of the password code even when a user had intended to have set the mode that requires the checking of the password code.

DISCLOSURE OF THE INVENTION

An object of this invention is therefore to provide a portable information processing device having password code checking function that enables switching between requiring mode and non requiring mode for the checking of a password code to use the device while ensuring adequate security.

(1) A first feature of this invention resides in a portable information processing device having password code checking function comprising a rewritable, non-volatile memory which holds stored contents even after supply of power has been cut off, and a control device for accessing the non-volatile memory:

wherein the non-volatile memory is a memory in which individual unit areas are defined and an erasure process and a subsequent changing process are required to write a data into a specific unit area, all bits in the specific unit area being set to the first logic state in the erasure process, and desired bits in the specific unit area relating to the data to be written being changed from the first logic state to the second logic state in the changing process, a predetermined password code and a checking requirement flag which indicates whether or not checking by the password code is required, are stored in the non-volatile memory, the control device has a function, whereby in the case where the checking requirement flag indicates a "required" state, predetermined processes are executed under the condition that a password code that has been input from the exterior and a password code that has been stored in the non-volatile memory are found to be matched in a checking process, and a function, whereby in the case where the checking requirement flag indicates a "not required" state, the predetermined processes are executed without performing the checking process, and the control device further has a function of attaching a predetermined error check code to data to be stored in a writing process into the non-volatile memory, and a function of judging whether or not an attached error check code to data is correct in a reading process from the non-volatile memory, and handling data that have been read out as correct data under the condition that a judgment result indicating that the attached error check code is correct has been obtained, characterized in that the control device is equipped with processing functions whereby the checking requirement flag is handled as indicating the "required" state when a bit or bits constituting the checking requirement flag are in the first logic state, the checking requirement flag is handled as indicating the "not required" state when the bit or bits are in the second logic state, an error check code is prevented from being attached in a process of writing the checking requirement flag, and the checking requirement flag is always handled as being a correct flag, without judgment of an error check code, in reading the checking requirement flag.

(2) A second feature of this invention resides in a portable information processing device having password code checking function comprising a rewritable, non-volatile memory which holds stored contents even after supply of power has been cut off, and a control device for accessing the non-volatile memory:

wherein the non-volatile memory is a memory in which individual unit areas are defined and an erasure process and a subsequent changing process are required to write a data into a specific unit area, all bits in the specific unit area being set to the first logic state in the erasure process, and desired bits in the specific unit area relating to the data to be written being changed from the first logic state to the second logic state in the changing process, a predetermined password code and a checking requirement flag which indicates whether or not checking by the password code is required, are stored in the non-volatile memory, the control device has a function, whereby in the case where the checking requirement flag indicates a "required" state, predetermined processes are executed under the condition that a password code that has been input from the exterior and a password code that has been stored into the non-volatile memory are found to be matched in a checking process, and a function, whereby in the case where the checking requirement flag indicates a "not required" state, the predetermined processes are executed without performing the checking process, and the control device further has a function of attaching a predetermined error check code to data to be stored in a writing process into the non-volatile memory, and a function of judging whether or not an attached error check code to data is correct in a reading process from the non-volatile memory, and handling data that have been read out as correct data under the condition that a judgment result indicating that the attached error check code is correct has been obtained, characterized in that the control device is equipped with processing functions whereby the checking requirement flag is handled as indicating the "required" state when a bit or bits constituting the checking requirement flag are in the first logic state, the checking requirement flag is handled as indicating the "not required" state when the bit or bits are in the second logic state, and when there is an error in a result of judgment of an error check code with regard to the checking requirement flag, the checking requirement flag is always handled as indicating the "required" state regardless of a logic state of a bit or bits constituting the checking requirement flag.

(3) A third feature of this invention resides in a portable information processing device having password code checking function according to the above-described first or second feature:

wherein a dedicated unit area for writing the checking requirement flag is provided and data besides data related to the checking requirement flag are prevented from being written into the dedicated unit area.

(4) A fourth feature of this invention resides in a portable information processing device having password code checking function according to the above-described first to third features:

wherein a setting authorization code, which indicates an authorization for setting a checking requirement flag, is stored in the non-volatile memory, and the control device has a function by which, in the case where a checking requirement setting command, which includes the setting authorization code, is input from the exterior in order to set the checking requirement flag, a writing process for setting the checking requirement flag is executed under the condition that a setting authorization code that has been input from the exterior matches a setting authorization code stored in the non-volatile memory.

(5) A fifth feature of this invention resides in a portable information processing device having password code checking function according to the above-described first to fourth features:

wherein in performing a process of rewriting a checking requirement flag, the control device performs an erasure process to set all bits of n digits that constitutes an unit area containing a checking requirement flag to the first logic state and thereafter prepares n-digit bit data including a checking requirement flag that indicates a new logic state in a register, and performs a process of writing the bit data in the register into the unit area.

(6) A sixth feature of this invention resides in a portable information processing device having password code checking function according to the above-described first to fifth features:

wherein the portable information processing device is constituted by an IC card including a CPU (Central Processing Unit) with a function for accessing the non-volatile memory and a program memory for storing and executing a program for operating said CPU, and the control device is constituted by the CPU and the program memory.

BEST MODE FOR CARRYING OUT THE INVENTION

Figure 1:
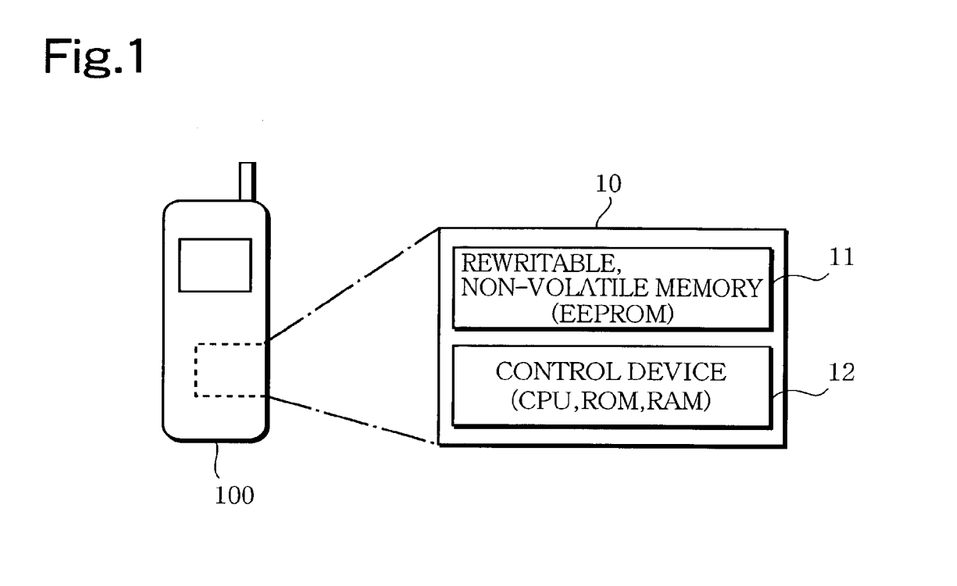
FIG. 1 is a diagram, which shows an embodiment in which this invention is applied to an IC card 10 incorporated in a cellular phone 100.

The present invention shall now be described based on an illustrated embodiment. FIG. 1 is a diagram, which shows an embodiment in which this invention is applied to an IC card 10 incorporated in a cellular phone 100. When such an IC card 10 (so-called flash memory) is mounted inside the cellular phone 100, power is supplied to the IC card 10 from the cellular phone 100, and the IC card 10 operates upon receiving this supply of power. Pushbuttons and a liquid crystal display for the cellular phone 100 function as input/output interfaces to the IC card 10, and a user can send command and data to the IC card 10 by operating the pushbuttons of cellular phone 100 and check the responses from the IC card 10 on the liquid crystal display of cellular phone 100.

The IC card 10 has incorporated therein a rewritable non-volatile memory 11 and a control device 12 for accessing the non-volatile memory 11. Non-volatile memory 11, to be specific, is arranged from an EEPROM, and the stored contents thereof are maintained even after the supply of power from the cellular phone 100 has been cut off. The stored data in the non-volatile memory 11 therefore will not be lost even when the IC card 10 is removed from the cellular phone 100. The control device 12, to be specific, is arranged from a CPU, ROM (Read Only Memory), and RAM (Random Access Memory). The CPU has functions for performing the processes of accessing the EEPROM, the processes of communicating with the cellular phone 100, and various other computing processes. The ROM functions as a program storage memory that stores a program for making the CPU operate. This program mainly denotes procedures concerning what processes should be executed and what types of responses should be returned to the cellular phone 100 when a specific command is sent from the cellular phone 100, and the CPU executes various processes in accordance with these procedures. The RAM is a volatile memory, in which the stored contents are held only when power is supplied from the cellular phone 100, and functions as a program execution memory that provides a working area for the program executed by the CPU. Though in the example described here, a ROM is used as a program storage memory, a predetermined program may be loaded in the EEPROM and a part of the EEPROM may be used as the program storage memory instead.

Figure 2:
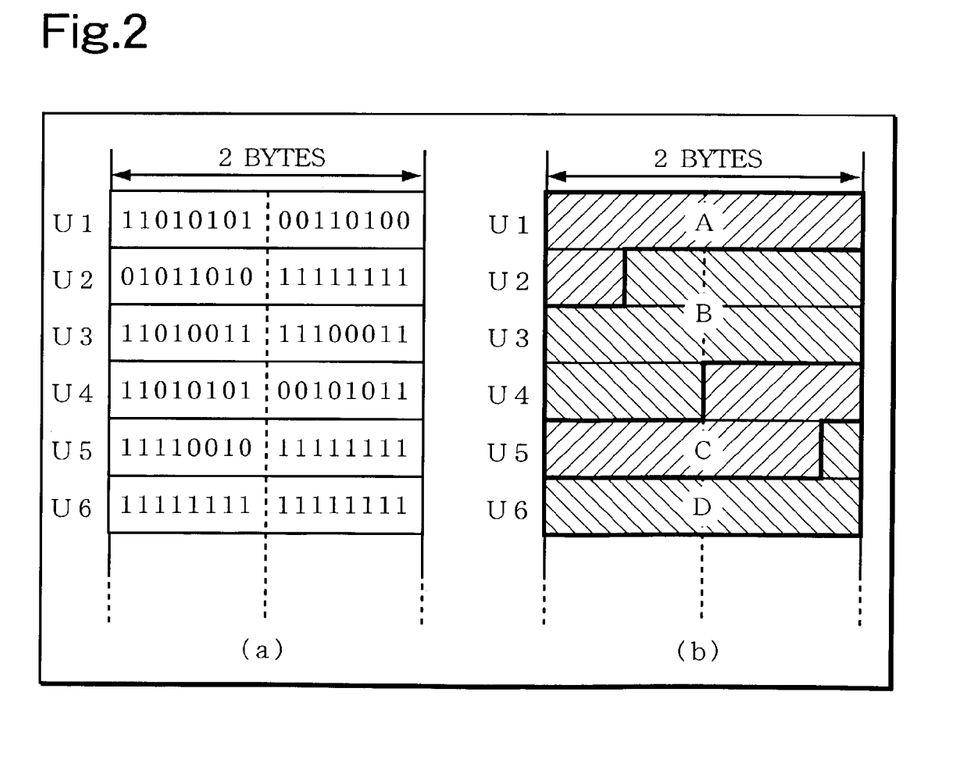
FIG. 2 is a memory map, which indicates the respective unit areas defined in an EEPROM (ElectricallY Erasable Programmable Read Only Memory).

Though the EEPROM is a memory having a function of holding the stored contents even after the supply of power is cut off, it has several restrictions in comparison to a RAM in regard to performing a writing process. That is, with an EEPROM, ① a predetermined writing voltage must be supplied, ② a longer writing time is required in comparison to a RAM, and ③ writing must be performed after performing an erasure process on each predetermined unit area. FIG. 2 is a memory map for explaining the abovementioned restriction ③. FIG. 2(*a*) shows an example of a memory map of the EEPROM 11 with which a single unit area is arranged at every 2 bytes. In this example, a plurality of unit areas U1, U2, U3, . . . , each with a length of 2 bytes, are defined as illustrated in the Figure, and a writing process is performed on each individual unit area. This unit area is merely an area that is handled as a single unit in performing a physical writing process and does not signify that a single data is written into a single unit area. FIG. 2(*b*) is a memory map, which shows a condition where specific data A, B, C, and D have been written into the memory area shown in FIG. 2(*a*). Each of the data A, B, C, and D differs in data length and is written across a plurality of unit areas where necessary. For example, data C occupies from the ninth bit of the unit area U4 to the fourteenth bit of the unit area U5, and for the writing of this data C, a writing process for the unit area U4 and a writing process for the unit area U5 must be performed.

Due to the abovementioned restriction ③, in performing writing into a specific unit area, an erasure process, which sets all bits in the unit area to a first logic state, must be performed and thereafter a process of changing the logic states of the desired bits, corresponding to the data to be written, from the first logic state to a second logic state must be performed. To be more specific, an example where the first logic state is "1" and the second logic state is "0" shall now be described (needless to say, the logic states may be reversed). In performing writing into a specific unit area, first, the erasure process of setting all bits of the unit area to "1" should be performed, and thereafter, the process of changing the desired bits, corresponding to the data to be written, to "0" should be performed. This is a restriction that is based on the characteristic of an EEPROM that the electrical process of changing a "0" bit to a "1" bit is greater in burden than the electrical process of changing a "1" bit to a "0" bit.

Figure 3:
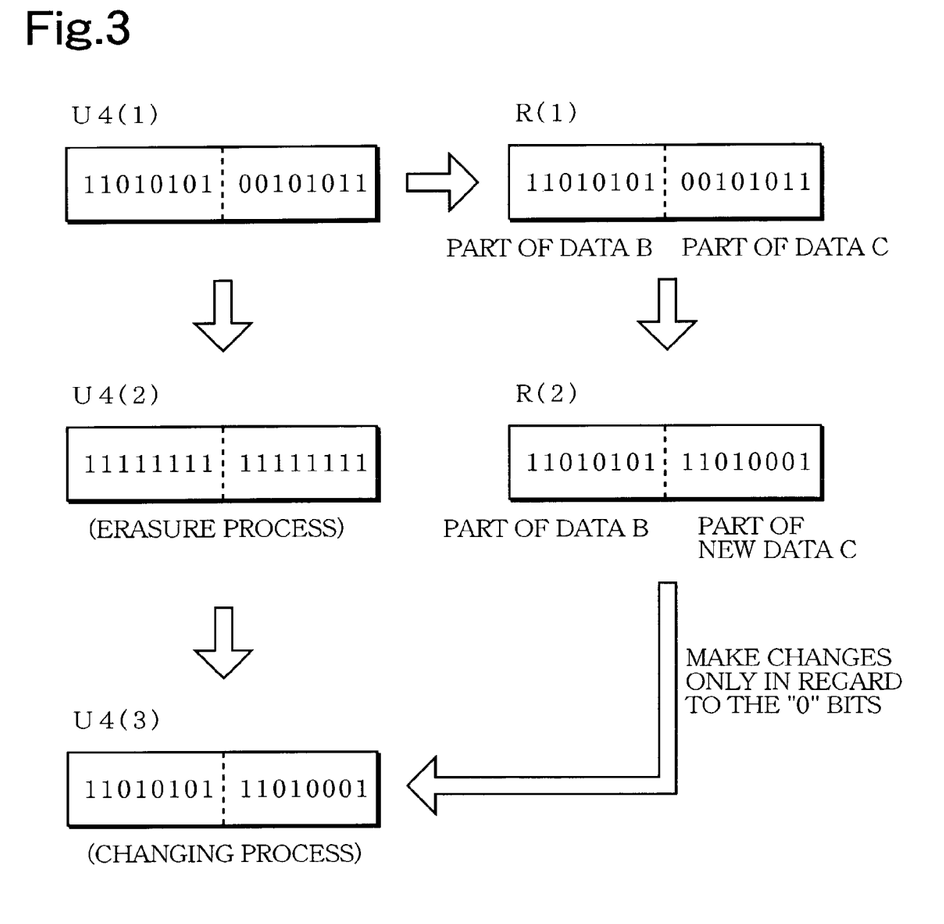
FIG. 3 is a diagram, which illustrates the procedure of the process of writing into unit areas in the EEPROM.

Due to this restriction, when for example the data C shown in FIG. 2(*b*) is to be overwritten by new data, the process of writing into an EEPROM must be performed as shown specifically in FIG. 3. Suppose that the state of unit area U4 prior to the writing process is the state shown as bit string U4(1) in FIG. 3. In this case, first, the contents of this unit area U4(1) are saved in a register R. As with a unit area, register R is a storage location with a length of 2 bytes, and the bit string shown in FIG. 3 as bit string R(1) (the same bit string as bit string U4(1)) becomes stored in this register R. Here, the 8 bits of the first half of the register R(1) are a part of data B and the 8 bits of the latter half are a part of data C.

Subsequently, an erasure process is performed on unit area U4. That is, all bits that comprise the unit area U4 are set to the "1" state. The unit area U4(2) shown in FIG. 3 illustrates the bit configuration after the erasure process has been performed in this manner. Meanwhile, a new bit string, which is to be stored, is prepared in the register R. With this example, since rewriting is to be performed in regard to data C, the 8 bits of the latter half of the register R are replaced by a part of the new data C, and the register R enters the state shown as register R(2) in FIG. 3. Subsequently, the contents of this register R(2) are stored into the unit area U4(2), and in actuality, a process is carried out where, for the "0" bits among the respective bits in the register R(2), the states of the corresponding bit positions in the unit area U4(2) are changed to "0". By such a changing process, the same bit string as that of the register R(2) becomes written into the unit area U4(3). Though the writing process for the unit area U4 was described above, the same sort of writing process is performed for the unit area U5, and the rewriting of the data C shown in FIG. 2(*b*) is thereby completed.

Figure 4:
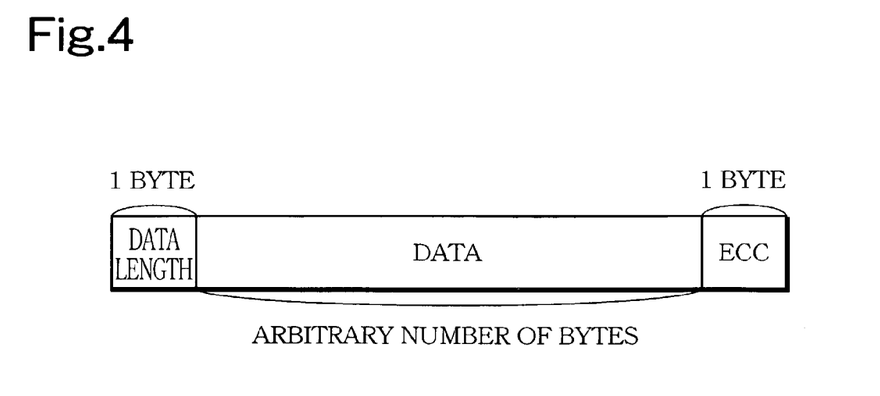
FIG. 4 is a diagram, which shows an example of a normal data format of data written into the EEPROM.

FIG. 4 is a diagram, which shows an example of a normal data format of data written into the EEPROM. With the example shown here, a numerical value that indicates the data length is added to the first single byte of each data and an error check code ECC is added to the last single byte. So that the length of the actual data may be of an arbitrary number of bytes, the byte number of this data is added to the first byte as a data length, and an error check code ECC, generated based on this data by a predetermined algorithm, is added to the last byte. According to such a data format, writing of data into the EEPROM 11 is performed. Each of the data A, B, C, and D is data that has been denoted in such a data format, and with each data, the first single byte indicates the data length and the last single byte comprises an error check code ECC. When the CPU performs writing into the EEPROM 11, it performs a process of attaching the data length to the first byte of the data and attaching the error check code ECC to the last byte. Oppositely, when the CPU reads out data from the EEPROM 11, it performs the process of judging whether or not the attached error check code ECC is correct, and processes that handle the read data as correct data are carried out only when a judgment result indicating that the ECC is correct is obtained. If a judgement result indicating that the ECC is in error is obtained, the data that is read is not handled as correct data and an error process is performed as necessary.

The IC card 10 shown here has a password code checking function, and when this function is enabled, the input of a predetermined password code is requested each time IC card 10 is used (each time the switch of the cellular phone 100 is turned ON to start the supply of power and the CPU inside the IC card 10 is reset). This password code is stored in advance as data in the EEPROM 11 (stored according to the data format shown in FIG. 4), and when a password code is input from the exterior via the cellular phone 100, the CPU inside the IC card 10 compares the password code stored in advance in the EEPROM 11 with the password code input from the exterior, and under the condition that these password codes match, executes the subsequent processes. In the case where the password codes are found to be unmatched as a result of checking, the CPU returns a response indicating the denial of subsequent access to the cellular phone 100 to enable the user to recognize, on the liquid crystal display of the cellular phone 100, that access has been denied.

When the password code checking function is constantly enabled in the above manner, a user must perform the operation of inputting the password code each time he or she turns ON the switch of the cellular phone 100 and will thus be forced to perform an extremely complicated operation. For practical use, it will be convenient if a mode can be set on which, while carrying the cellular phone 100, continuous use will be enabled without input of the password code every time as long as the password code has been input just once initially.

Figure 5:
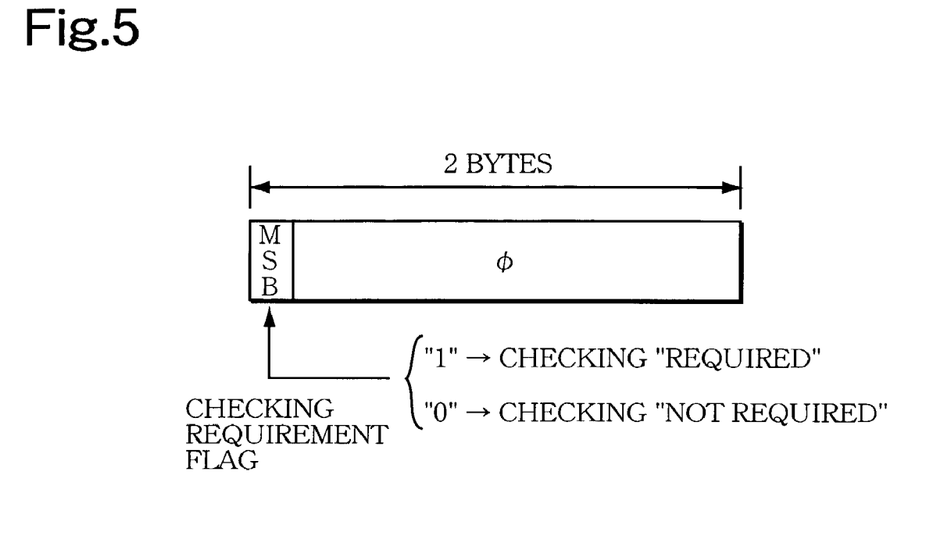
FIG. 5 is a diagram, which shows an example of the format of a checking requirement flag used in this invention.
Figure 6:
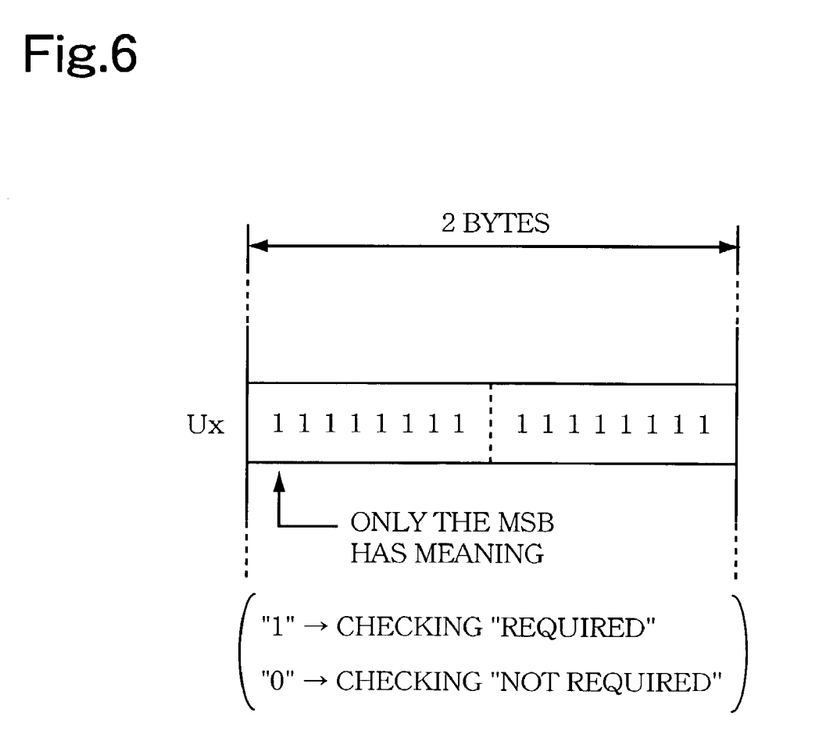
FIG. 6 is a diagram, which shows the condition where 2-byte data, which includes the checking requirement flag, has been written into a dedicated unit area Ux used in this invention.

The IC card 10 according to this invention is characterized in that switching between enabling and disabling the above-described password code checking function is possible and especially in that this switching function is realized under the condition of adequate security. When a user feels that the password code checking function is troublesome, he or she can perform a setting operation that disables this function and when the user feels that the checking function is necessary, he or she can perform a setting operation that enables this function. In order to enable such switching of the setting mode to be performed freely, a checking requirement flag, which indicates whether or not checking by a password code is necessary, is arranged to be written into the EEPROM 11 with this invention. FIG. 5 shows an example of a format of this checking requirement flag. With this example, the checking requirement flag itself is comprised of 1-bit data and an area of 2 bytes is secured as the storage area for this flag. To be more specific, of this area of 2 bytes (16 bits), the MSB (Most Significant Bit) is used as a checking requirement flag, and the remaining 15 bits are meaningless bits that are not used at all (indicated by φ in the Figure). Here, it is defined that when the checking requirement flag is "1", it indicates that checking is "required" and when the checking requirement flag is "0", it indicates that checking is "not required". Furthermore, the 2 bytes of data, including this checking requirement flag, are written into a dedicated unit area. FIG. 6 is a diagram, which shows the condition where the 2 bytes of data, which include the checking requirement flag, are written into this dedicated unit area Ux. Though 16 bits of data exist in the dedicated unit area Ux, only the MSB among these data functions as a checking requirement flag that has a meaning and the remaining 15 bits do not have any meaning whatsoever. In the illustrated example, since MSB is "1", it indicates the state in which checking is "required".

The built-in CPU of the IC card 10 is reset at the same time the power of the cellular phone 100 is turned ON, and in the procedures subsequent this reset, the CPU reads the checking requirement flag stored as the MSB of the dedicated unit area Ux and thereby recognizes the requirement mode for the password code checking process. And in the case where this checking requirement flag indicates the "required" mode (in the case where the flag is "1" in the present example), the CPU recognizes that the above-described password code checking function is enabled, performs the process of requesting the input of the password code, and under the condition that the password code that has been input from the exterior and the password code that has been written in the EEPROM 11 in advance are found to be matched in the checking process, executes the subsequent processes. Meanwhile, if the checking requirement flag indicates the "not required" mode (in the case where the flag is "0" in the present example), the CPU executes the subsequent processes without performing the abovementioned checking process.

Figure 7:
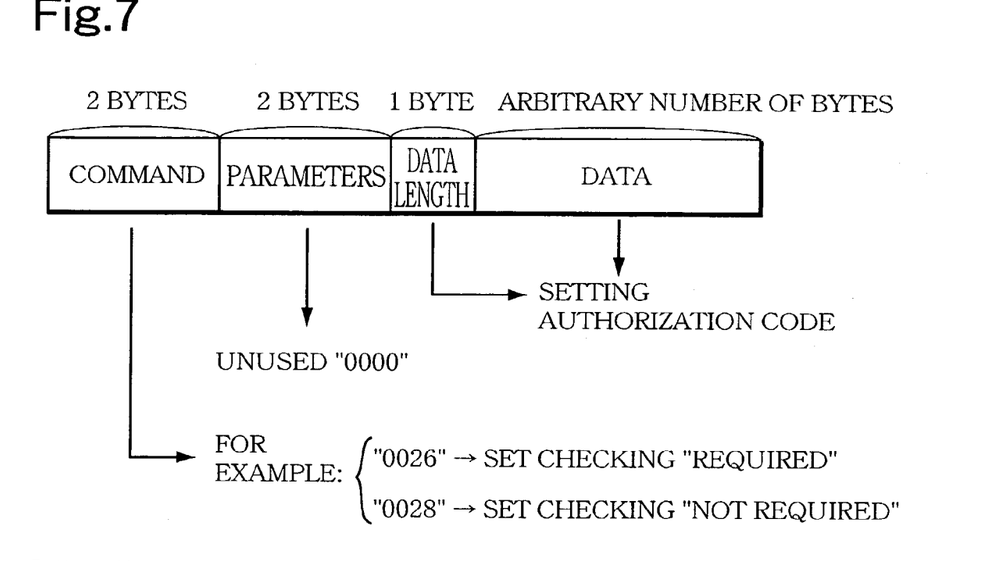
FIG. 7 is a diagram, which shows an example of the format of a checking requirement mode command used in this invention.

A user can change the requirement mode by giving a checking requirement setting command, having a format such as shown in FIG. 7, to the IC card 10 from the cellular phone 100. With the example shown in FIG. 7, the first 2 bytes comprise the command code, and for example, the command code "0026" indicates a command that the checking "required" mode be set, and the command code "0028" indicates a command that the checking "not required" mode be set. Though the next 2 bytes comprise parameters concerning the command code, since parameters are not required by the checking requirement setting command, these 2 bytes are unused (for example, "0000" or other arbitrary parameter value may be set). The next single byte indicates the data length and data of an arbitrary number of bytes follow. The data length indicates the length of the data of arbitrary number of bytes. The data of arbitrary number of bytes comprise a setting authorization code, which indicates the authorization for setting the checking requirement flag and is a code that is input by the user from the cellular phone 100. This setting authorization code is also stored in advance as data in the EEPROM 11, and when the checking requirement setting command of the format such as shown in FIG. 7 is input from the exterior, the CPU executes the writing process for setting the checking requirement flag under the condition that the setting authorization code input from the exterior matches the setting authorization code that has been written in advance in the EEPROM 11. As a result, the change of the checking requirement flag can only be made by one who knows the setting authorization code. Normally, the password code necessary for using the IC card and the setting authorization code that indicates the authorization for setting the checking requirement flag may be the same code. In this case, only the user will be able to change the setting of the checking requirement flag.

Figure 8:
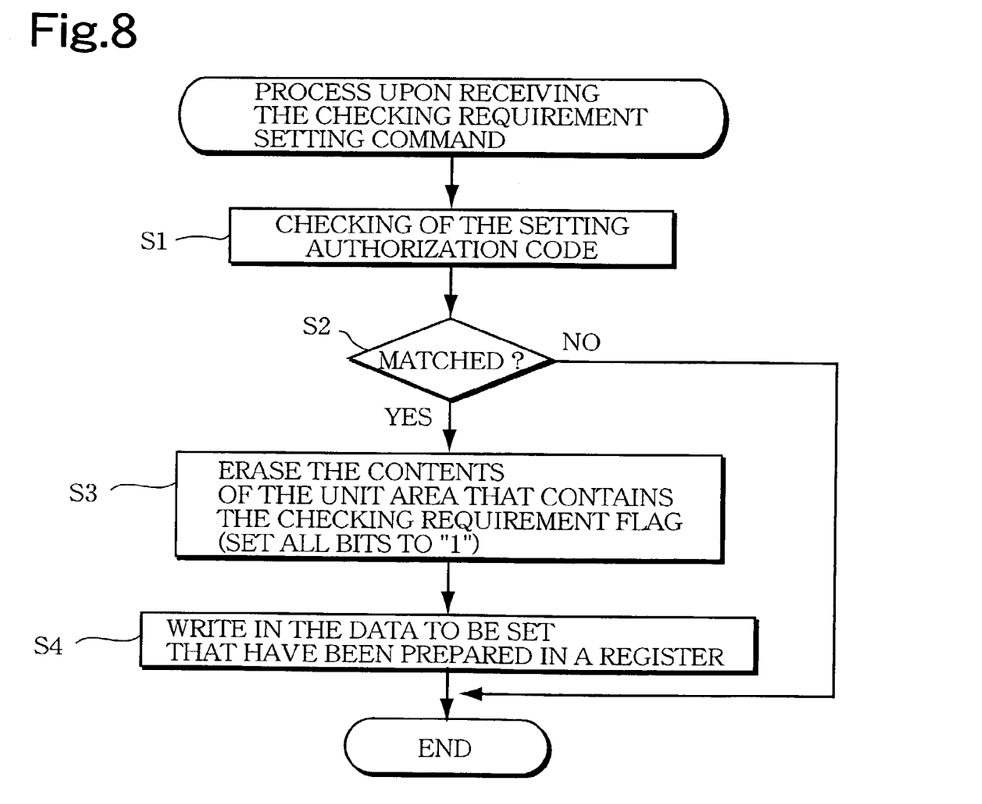
FIG. 8 is a flowchart, which illustrates the processing procedure that is carried out when a checking requirement mode command of the format shown in FIG. 7 is given.

FIG. 8 is a flowchart, which illustrates the processing procedure that is carried out when the checking requirement setting command is received. First in step S1, the process of compares the setting authorization code that is contained in this command with the setting authorization code that has been written in advance in the EEPROM 11 is performed. If as a result of checking, the codes are found to be unmatched, the process is interrupted at this point and the checking requirement flag setting process is not performed. If as a result of checking, the codes are found to be matched, step S3 is entered from step S2 and an erasure process (the process of setting all bits to "1") is performed on the dedicated unit area Ux, which contains the checking requirement flag, and furthermore in step S4, the process of writing the data to be set, which have been prepared in a register, into the unit area Ux is performed. In the case where the checking requirement setting command of command code "0026" is given, since the checking "required" mode must be set, the process of writing the data to be set, for example, "11111111 11111111", which have been prepared in the register, is performed (actually in this case, the state resulting from the erasure process in step S3 may be maintained). On the other hand, if the checking requirement setting command of command code "0028" is given, since the checking "not required" mode must be set, the process of writing the data to be set, for example, "01111111 11111111", which have been prepared in the register, is performed (actually in this case, the process of changing just the MSB from "1" to "0" needs to be performed).

By thus providing a checking requirement flag in the EEPROM 11 and arranging so that whether or not the checking process is to be performed is judged in accordance to the state of this checking requirement flag and the state of the checking requirement flag can be rewritten using the checking requirement setting command, a user is enabled to switch, as necessary, between enabling and disabling the password code checking function. Moreover, since the switching method described above with regard to the embodiment has the following three characteristics, adequate security can be ensured.

The first characteristic is that the checking requirement flag is handled as indicating the "required" state if the bit that comprises the flag is in the first logic state of "1" (the logic state following the erasure process) and handled as indicating the "not required" state if the bit that comprises the flag is in the second logic state of "0". As has been mentioned already, in writing into the EEPROM 11, first the erasure process of setting all bits in a unit area to the first logic state of "1" must be performed and thereafter the process of changing the necessary bits to the second logic state of "0" must be performed. Now suppose that due to some circumstance, this writing process fails in the middle and the writing process is interrupted with all bits being kept in the first logic state of "1". To be more specific, this corresponds to the case where, in the processing procedure shown in FIG. 8, the procedure has progressed to the process of step S3 but step S4 has not been executed due to some circumstance. Even when such an accident occurs, since the first logic state "1" of the checking requirement flag is handled as indicating the "required" state with the present invention, the checking requirement flag will always be set to the "required" state (the safer state in terms of security) when an accident occurs. In other words, a measure is taken so that even when some accident occurs in the writing process, the conditions will always fall to the safer side in terms of security. Obviously, if the user had desired the checking "not required" state, he or she can set the checking requirement flag to the "not required" state by inputting the checking requirement setting command to set the checking "not required" state again.

A second characteristic is that an error check code is not attached to the checking requirement flag and when this checking requirement flag is read, it is always handled as a correct flag without judging the error check code. As shown in FIG. 4, in the case of normal data, the error check code ECC is always added to the last byte and then writing into the EEPROM 11 is performed, and in reading the data, this error check code ECC is checked first. However, with the checking requirement flag, the error check code ECC is not attached as shown in FIG. 5, and in reading this flag, the error check code ECC is not checked. It is important that the error check of the checking requirement flag is not performed. When an error is detected by the error check of data that has been read, the data will not be handled as correct data and the error processing procedure will be performed. However, if an error occurs in the process of reading the checking requirement flag, it cannot be judged whether the setting is the one that enables the password code checking function or the one that disables the checking function, and since the process in the initial stage of access to the IC card thus becomes interrupted, the IC card will no longer operate correctly (and must be repaired by a department in charge of maintenance). With the present invention, since an error check is not performed on the checking requirement flag, even when for example a single arbitrary bit that is written in the dedicated unit area Ux in the EEPROM 11 undergoes data distortion, there will be no problems in operation as long as the inherent checking requirement flag that has been written into the MSB is normal.

A third characteristic is that, as shown in FIG. 6, a dedicated unit area Ux for writing in the checking requirement flag is provided in the EEPROM 11 and the writing of data besides the checking requirement flag into this dedicated unit area Ux is prevented. Providing a dedicated unit area Ux for the checking requirement flag in such a manner means that writing into this dedicated unit area Ux will be performed only when the checking requirement setting command, shown in FIG. 7, is provided. There will thus be no possibility for the checking requirement flag to become rewritten by the execution of another command. This is especially effective in terms of preventing a criminal, etc., who has illegitimately obtained the IC card 10, from attempting to rewrite the checking requirement flag to the checking "not required" state. There is no other method for rewriting the checking requirement flag besides providing the checking requirement setting command shown in FIG. 7. Furthermore, since a setting authorization code is required for executing this checking requirement setting command, any attempt to rewrite the checking requirement flag by illegitimate means is made extremely difficult.

Lastly, modification examples of this invention shall be described. With the embodiment described above, "an error check code is not attached to the checking requirement flag and when this checking requirement flag is read, it is always handled as a correct flag without judging the error check code," has been mentioned above as the second characteristic. With the modification example to be described here, processes, in which "an error check code is also attached to the checking requirement flag and when an error is judged as a result of judging the error check code for the checking requirement flag, the checking requirement flag is always handled as indicating the required state, regardless of the logic state of the bit that comprises the checking requirement flag", are performed.

For example, whereas in the case of the above-described embodiment shown in FIG. 6, a dedicated unit area Ux, comprised of 2 bytes, was provided for recording the checking requirement flag and only the MSB was used as a flag with a meaning, in the case where the modification example described here is to be put into practice, the area of the single lower byte can be used as the area for recording the error check code ECC (the code obtained based on the single upper byte by a predetermined logic operation). In referencing the bit value of the checking requirement flag, the 2 bytes of data of the dedicated unit area Ux are read out and a process of judging whether or not the data of the first byte (the data containing the checking requirement flag) are correct based on the error check code ECC of the second byte is performed. In this case, if the data are judged to be correct as a result of judgment of the error check code, processes are executed under the recognition that the MSB of the first byte is the correct value of the checking requirement flag, and if the data are judged to be in error as a result of judging the error check code, the checking requirement flag is always handled as indicating the "required" state, regardless of the logic state of the bit that comprises the checking requirement flag (the MSB of the dedicated unit area Ux). By handling the data in such a manner, even when some error occurs in the writing or reading of the checking requirement flag, the safer side is always recognized, in other words, the checking requirement flag is recognized in the checking "required" state so that adequate security can be ensured.

Though this invention has been described based on the illustrated embodiment, this invention is not limited to this embodiment and may be put into practice in various other forms. For example, though an example where this invention was applied to an IC card to be mounted in a cellular phone 100 was described above, this invention may obviously be applied to other IC cards. Also, the application of this invention is not limited to just IC cards but covers a wide range including cellular phones themselves and other portable information processing devices with password code checking function. Furthermore, though with the above-described embodiment, the checking requirement flag was comprised of 1-bit data, the checking requirement flag may be comprised of data of several bits in order to increase the redundancy (for example, a definition with redundancy, such as a flag "111", comprised of 3 bits indicates the checking "required" state and a flag "000" indicates the checking "not required" state, is also possible).

As has been described above, with a portable information processing device having password code checking function by this invention, it can be performed to switch between a requiring mode and a non requiring mode of password code checking during use while ensuring adequate security.

INDUSTRIAL APPLICABILITY

This invention can be widely applied to portable information processing devices, such as IC cards, cellular phones, and PDA's (Personal Digital Assistants) and is especially suitable for application to personal-use portable information processing devices that store various personal information related to privacy.

The invention claimed is:

1. A portable information processing device (10) having a checking function for an input password code, said portable information processing device comprising:
   a rewritable non-volatile memory (11) which holds stored contents even after supply of power has been cut off; and
   a control device (12) for accessing said rewritable non-volatile memory,
   wherein said rewritable non-volatile memory (11) is a memory in which unit areas (U1 to U6) are defined, an erasure process and a subsequent changing process are required to write data bits into at least a specific one of said unit areas, all said data bits in said specific one of said unit areas being set to a first logic state in said erasure process and desired ones of said data bits in said specific one of said unit areas being changed from said first logic state to a second logic state in said subsequent changing process, and a predetermined password code and a checking requirement flag bit or bits, which indicates whether or not checking by said predetermined password code is required, are stored,
   wherein said control device (12) has a function whereby, in a case where said checking requirement flag indicates said checking is required, predetermined processes are executed when said input password code and said predetermined password match in a checking process, and in a case where said checking requirement flag indicates said checking is not required, said predetermined processes are executed without performing said checking process, and
   wherein said control device (12) further has a function of attaching a predetermined error check code to data to be stored in a writing process into said rewritable non-volatile memory (11), and a function of judging whether or not said predetermined error check code attached to data is correct in a process reading from said non-volatile memory (11) and handling data that have been so read as correct data under the condition that said predetermined error check code attached to data is correct,
   characterized in that said control device (12) is equipped with processing functions whereby said checking requirement flag bit or bits is handled as indicating the "required" state when said checking requirement flag bit or bits are in said first logic state, said checking requirement flag bit or bits is handled as indicating the "not required" state when said checking requirement flag bit or bits are in said second logic state, an error check code is prevented from being attached in a process of writing said checking requirement flag bit or bits, and said checking requirement flag bit or bits is always handled without an error check code in reading said checking requirement flag bit or bits.

2. A portable information processing device having password code checking function as set forth in claim 1:
   wherein a dedicated unit area for writing the checking requirement flag is provided and data besides data related to the checking requirement flag are prevented from being written into said dedicated unit area.

3. A portable information processing device having password code checking function as set forth in claim 2:
   wherein a setting authorization code, which indicates an authorization for setting a checking requirement flag, is stored in the non-volatile memory (11), and the control device (12) has a function by which, in the case where a checking requirement setting command, which includes said setting authorization code, is input from the exterior in order to set the checking requirement flag, a writing process for setting the checking requirement flag is executed under the condition that a setting authorization code that has been input from the exterior matches a setting authorization code stored in said non-volatile memory (11).

4. A portable information processing device having password code checking function as set forth in claim 2:
   wherein in performing a process of rewriting a checking requirement flag, the control device (12) performs an erasure process to set all bits of n digits that constitutes an unit area containing a checking requirement flag to the first logic state and thereafter prepares n-digit bit data including a checking requirement flag that indicates a new logic state in a register, and performs a process of writing said bit data in said register into said unit area.

5. A portable information processing device having password code checking function as set forth in claim 2:
   wherein said portable information processing device (10) is constituted by an Integrated Circuit card including a Central Processing Unit with a function for accessing the non-volatile memory (11) and a program memory for storing and executing a program for operating said Central Processing Unit, and the control device (12) is constituted by said Central Processing Unit and said program memory.

6. A portable information processing device having password code checking function as set forth in claim 1:
   wherein a setting authorization code, which indicates an authorization for setting a checking requirement flag, is stored in the non-volatile memory (11), and the control device (12) has a function by which, in the case where a checking requirement setting command, which includes said setting authorization code, is input from the exterior in order to set the checking requirement flag, a writing process for setting the checking requirement flag is executed under the condition that a setting authorization code that has been input from the exterior matches a setting authorization code stored in said non-volatile memory (11).

7. A portable information processing device having password code checking function as set forth in claim 6:

wherein in performing a process of rewriting a checking requirement flag, the control device (12) performs an erasure process to set all bits of n digits that constitutes an unit area containing a checking requirement flag to the first logic state and thereafter prepares n-digit bit data including a checking requirement flag that indicates a new logic state in a register, and performs a process of writing said bit data in said register into said unit area.

8. A portable information processing device having password code checking function as set forth in claim 6:
wherein said portable information processing device (10) is constituted by an Integrated Circuit card including a Central Processing Unit with a function for accessing the non-volatile memory (11) and a program memory for storing and executing a program for operating said Central Processing Unit, and the control device (12) is constituted by said Central Processing Unit and said program memory.

9. A portable information processing device having password code checking function as set forth in claim 1:
wherein in performing a process of rewriting a checking requirement flag, the control device (12) performs an erasure process to set all bits of n digits that constitutes an unit area containing a checking requirement flag to the first logic state and thereafter prepares n-digit bit data including a checking requirement flag that indicates a new logic state in a register, and performs a process of writing said bit data in said register into said unit area.

10. A portable information processing device having password code checking function as set forth in claim 9:
wherein said portable information processing device (10) is constituted by an Integrated Circuit card including a Central Processing Unit with a function for accessing the non-volatile memory (11) and a program memory for storing and executing a program for operating said Central Processing Unit, and the control device (12) is constituted by said Central Processing Unit and said program memory.

11. A portable information processing device having password code checking function as set forth in claim 1:
wherein said portable information processing device (10) is constituted by an Integrated Circuit card including a Central Processing Unit with a function for accessing the non-volatile memory (11) and a program memory for storing and executing a program for operating said Central Processing Unit, and the control device (12) is constituted by said Central Processing Unit and said program memory.

12. A portable information processing device (10) having a checking function for password code comprising a non-volatile memory (11) which holds stored contents even after supply of power has been cut off, and a control device (12) for accessing said non-volatile memory:
wherein said non-volatile memory (11) is a memory in which individual unit areas (U1 to U6) are defined and an erasure process and a subsequent changing process are required to write a data into a specific unit area, all bits in said specific unit area being set to a first logic state in said erasure process, and desired bits in said specific unit area being changed from said first logic state to a second logic state in said subsequent changing process,
a predetermined password code and a checking requirement flag which indicates whether or not checking by said password code is required, are stored in said non-volatile memory (11), said control device (12) has a function, whereby in the case where said checking requirement flag indicates a "required" state, predetermined processes are executed under the condition that a password code that has been input from the exterior and a password code that has been stored into said non-volatile memory are found to be matched in a checking process, and a function, whereby in the case where said checking requirement flag indicates a "not required" state, said predetermined processes are executed without performing said checking process, and
said control device (12) further has a function of attaching a predetermined error check code to data to be stored in a writing process into said non-volatile memory (11), and a function of judging whether or not an attached error check code to data is correct in a reading process from said non-volatile memory (11), and handling data that have been read out as correct data under the condition that a judgment result indicating that said attached error check code is correct has been obtained,
characterized in that said control device (12) is equipped with processing functions whereby said checking requirement flag is handled as indicating the "required" state when a bit or bits constituting said checking requirement flag are in said first logic state, said checking requirement flag is handled as indicating the "not required" state when said bit or bits are in said second logic state, and when there is an error in a result of judgment of an error check code with regard to said checking requirement flag, said checking requirement flag is always handled as indicating the "required" state regardless of a logic state of a bit or bits constituting said checking requirement flag.

13. A portable information processing device having password code checking function as set forth in claim 12:
wherein a dedicated unit area for writing the checking requirement flag is provided and data besides data related to the checking requirement flag are prevented from being written into said dedicated unit area.

14. A portable information processing device having password code checking function as set forth in claim 13:
wherein a setting authorization code, which indicates an authorization for setting a checking requirement flag, is stored in the non-volatile memory (11), and the control device (12) has a function by which, in the case where a checking requirement setting command, which includes said setting authorization code, is input from the exterior in order to set the checking requirement flag, a writing process for setting the checking requirement flag is executed under the condition that a setting authorization code that has been input from the exterior matches a setting authorization code stored in said non-volatile memory (11).

15. A portable information processing device having password code checking function as set forth in claim 14:
wherein in performing a process of rewriting a checking requirement flag, the control device (12) performs an erasure process to set all bits of n digits that constitutes an unit area containing a checking requirement flag to the first logic state and thereafter prepares n-digit bit data including a checking requirement flag that indicates a new logic state in a register, and performs a process of writing said bit data in said register into said unit area.

16. A portable information processing device having password code checking function as set forth in claim 15:

wherein said portable information processing device (10) is constituted by an Integrated Circuit card including a Central Processing Unit with a function for accessing the non-volatile memory (11) and a program memory for storing and executing a program for operating said Central Processing Unit, and the control device (12) is constituted by said Central Processing Unit and said program memory.

17. A portable information processing device having password code checking function as set forth in claim 13:
wherein in performing a process of rewriting a checking requirement flag, the control device (12) performs an erasure process to set all bits of n digits that constitutes an unit area containing a checking requirement flag to the first logic state and thereafter prepares n-digit bit data including a checking requirement flag that indicates a new logic state in a register, and performs a process of writing said bit data in said register into said unit area.

18. A portable information processing device having password code checking function as set forth in claim 12:
wherein a setting authorization code, which indicates an authorization for setting a checking requirement flag, is stored in the non-volatile memory (11), and the control device (12) has a function by which, in the case where a checking requirement setting command, which includes said setting authorization code, is input from the exterior in order to set the checking requirement flag, a writing process for setting the checking requirement flag is executed under the condition that a setting authorization code that has been input from the exterior matches a setting authorization code stored in said non-volatile memory (11).

19. A portable information processing device having password code checking function as set forth in claim 12:
wherein in performing a process of rewriting a checking requirement flag, the control device (12) performs an erasure process to set all bits of n digits that constitutes an unit area containing a checking requirement flag to the first logic state and thereafter prepares n-digit bit data including a checking requirement flag that indicates a new logic state in a register, and performs a process of writing said bit data in said register into said unit area.

20. A portable information processing device having password code checking function as set forth in claim 12:
wherein said portable information processing device (10) is constituted by an Integrated Circuit card including a Central Processing Unit with a function for accessing the non-volatile memory (11) and a program memory for storing and executing a program for operating said Central Processing Unit, and the control device (12) is constituted by said Central Processing Unit and said program memory.

* * * * *